Patented Nov. 1, 1932

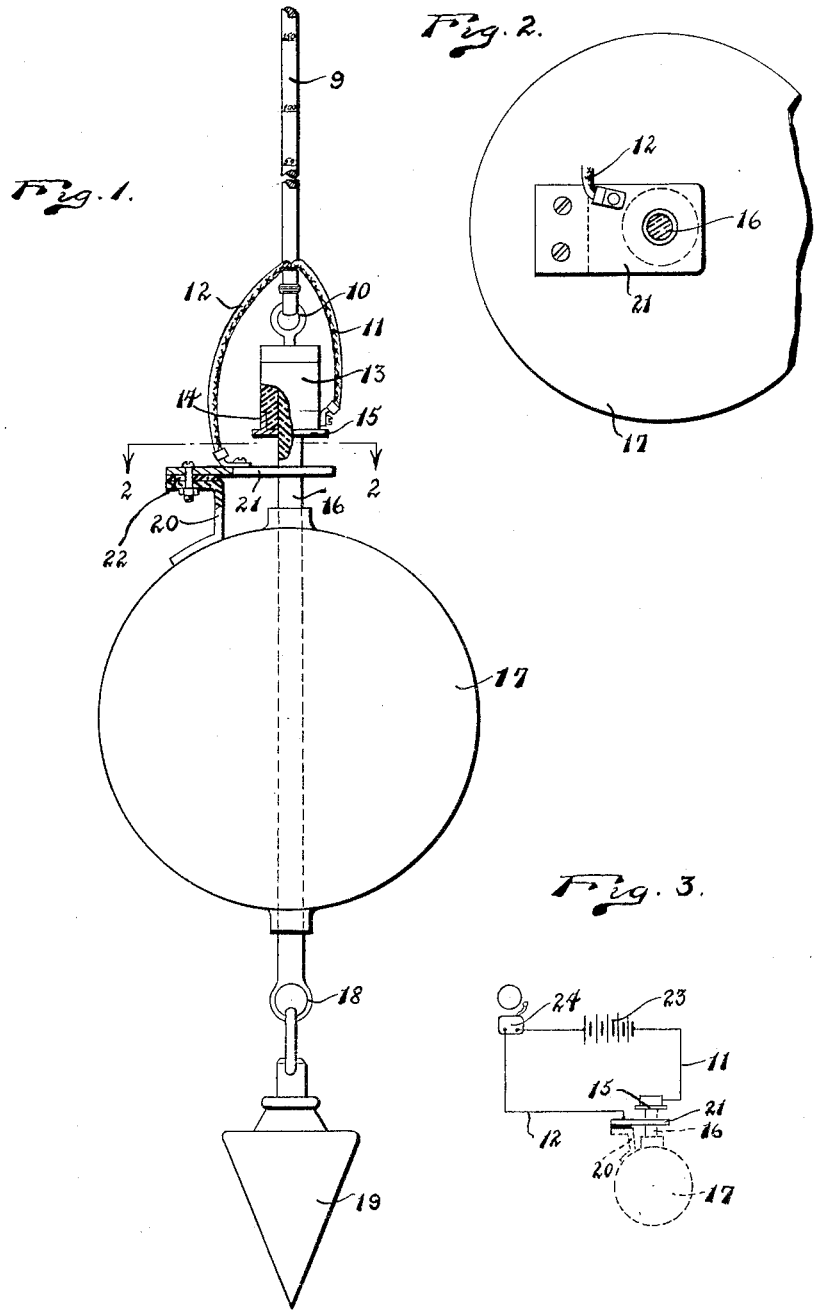

1,886,245

UNITED STATES PATENT OFFICE

MILOS KRAJAC, OF DETROIT, MICHIGAN

AEROPLANE SIGNAL

Application filed October 17, 1927. Serial No. 226,548.

My invention relates to a new and useful improvement in an aeroplane signal adapted for indicating to the operator of the aeroplane the elevation of the aeroplane within certain limits, and particularly adapted for indicating, when the operator is flying over a body of water, the approach of the aeroplane to the water within certain limits.

It is an object of the present invention to render the operation of an aeroplane over a body of water safer to a higher degree than at the present time.

It is another object of the invention to provide a signal device of this class which will be simple in structure, economical of manufacture and highly efficient in use.

Another object of the invention is the provision of a signal device of this class in which a float is mounted and adapted, upon floating out of its normal position, for closing a circuit and sounding an alarm in the aeroplane.

Other objects will appear hereinafter.

The invention consists in the combination and arrangement of parts hereinafter described and claimed.

The invention will be best understood by a reference to the accompanying drawing which forms a part of this specification and in which, Fig. 1 is a side elevational view of the invention.

Fig. 2 is a fragmentary view of the invention taken on line 2—2 of Fig. 1.

Fig. 3 is a diagrammatic view illustrating the circuit used in the invention.

A cable 9 may be attached to the aeroplane and its various lengths indicated by suitable numerals. This cable is attached at its lower end to an eyelet 10, and extending through the cable 9 are the wires 11 and 12. The eyelet 10 is secured to an insulating block 13 about which extends the metallic band 14, to which is secured one end of the wire 11. This band 14 carries the plate 15. Extending through the member 13 is a rod 16 which is also of insulating material, this rod 16 extending through the float 17 which is formed preferably from a metallic sphere. The rod 16 is provided with the eyelet 18, through which is depended the plummet 19. Mounted on the float 17 is a bracket 20, upon which is mounted the plate 21, through which the rod 16 slidably projects. Secured to the plate 21, which is preferably formed from metal, is one end of the wire 12, this plate 21 being insulated by the block 22 from the bracket 20.

In the aeroplane is positioned a battery 23, leading from one end of which is the wire 11. The other end of the battery 23 is connected to one terminal of the electrically operated bell 24, the other terminal being connected to the wire 12.

In operation, when flying, the operator would have the float 17 depending from the aeroplane a predetermined distance, which would be determined to be a safe distance for flying over a body of water. When the aeroplane should approach the body of water within this distance, the plummet 19 will sink in the water and the float 17 would rise to bring the plate 21 into contact with the plate 15, thus closing the circuit to the alarm 24, and indicating to the operator that he had lowered his plane beyond the safe elevation, so that he could remedy the situation and prevent a possible accident.

The simplicity of the structure of the device is believed obvious, as also is its durability.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A make and break mechanism of the class described, comprising: a supporting member; a contact member carried by said supporting member; a rod extending downwardly from said supporting member; a weight on the end of said rod; a float slidably mounted on said rod; and a contact carried by said float adapted, upon upward movement of said float on said rod a predetermined distance, for engaging said contact.

2. A make and break mechanism of the class described, comprising: a supporting member formed from insulating material; a metallic band on said supporting member; a contact plate connected to said band; a rod of insulating material projecting outwardly from said contact plate; a float slidably mounted on said rod; a bracket mounted on said float; and a contact plate mounted on said bracket, said rod projecting through said contact plate.

In testimony whereof I have signed the foregoing specification.

MILOS KRAJAC.